UNITED STATES PATENT OFFICE.

WILHELM BAUER, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

RED DISAZO DYE.

No. 839,360.

Specification of Letters Patent.

Patented Dec. 25, 1906.

Application filed July 13, 1906. Serial No. 326,117.

*To all whom it may concern:*

Be it known that I, WILHELM BAUER, doctor of philosophy, chemist, a citizen of the German Empire, residing at Vohwinkel, near Elberfeld, Kingdom of Prussia, Germany, have invented new and useful Improvements in Red Disazo Dyes, of which the following is a specification.

This invention relates to the preparation of new tetrazo dyestuffs by the combination of one molecule of the tetrazo compound of para-para-diaminodiphenylether of hydroquinon of the formula

with two molecules of an azo-dyestuff component of which at least one is the 2-amino-5-naphthol-7-sulfonic acid or a substituted derivative thereof. The new disazo dyestuffs possess good affinity for the vegetable fiber. They dye unmordanted cotton bright-red shades fast to acids.

The process for the production of these dyestuffs consists in combining one molecule of tetrazotized para-para-diaminodiphenylether of hydroquinon of the above given formula either with two molecules of 2-amino-5-naphthol-7-sulfonic acid or substituted derivatives thereof or with one molecule of one of these compounds and one molecule of any other suitable component, or vice versa.

The new dyestuffs correspond to the general formula

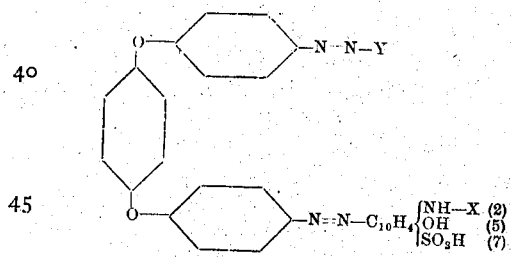

wherein Y stands for an azo-dyestuff component, such as a naphthol-sulfonic acid, aminonaphthol-sulfonic acid, acidylaminonaphthol-sulfonic acid, or derivatives thereof. X stands for hydrogen, alkyl, acidyl, or aryl, such as acetyl, $(-CH_2COOH,)$ benzoyl, phenyl, tolyl, or the like. They are in the shape of their alkaline salts dark powders soluble in water with a red color, dyeing unmordanted cotton red shades and yielding upon reduction with stannous chlorid and hydrochloric acid para-para-diaminodiphenylether of hydroquinon.

The para-para-diaminodiphenylether of hydroquinon, unknown till now, is obtained by treating salts of hydroquinon—*e. g.*, the potassium salt—with para-nitrohalogen-benzene—*e. g.*, para-nitrochlorobenzene—and subsequent reduction of the resulting dinitro compound. The new body crystallizes from alcohol in the shape of colorless needles, melting at 170° centigrade. It is soluble in hot alcohol, ether, and benzene. Its HCl salt forms long colorless needles easily soluble in water. They are precipitated again from the aqueous solution by the addition of concentrated hydrochloric acid.

The invention is illustrated by the following examples, the parts being by weight:

Example I: Two hundred and ninety-four parts of para-para-diaminodiphenylether of hydroquinon are diazotized in the usual manner by means of one hundred and forty parts of sodium nitrite and the necessary quantity of hydrochloric acid. The resulting tetrazo compound is then added to a well-cooled solution of four hundred and eighty parts of 2-amino-5-naphthol-7-sulfonic acid, to which solution sufficient sodium carbonate has been added to maintain the whole alkaline. The formation of the dyestuff is complete after some hours. The dyestuff precipitated during the preparation is filtered off and dried. It is after being dried and pulverized a dark powder having a metallic luster soluble in water with a red and in concentrated sulfuric acid with a violet color and yielding upon reduction with stannous chlorid and hydrochloric acid para-para-diaminodiphenylether of hydroquinon and diamino-5-naphthol-7-sulfonic acid. It dyes unmordanted cotton scarlet-red shades fast to acids. The dye-baths are nearly exhausted after dyeing. The process is carried out in an analogous manner on replacing the 2- amino-5-naphthol-7-sulfonic acid with the substituted derivatives of this acid, such as 2-acetylamino-5-naphthol-7-sulfonic acid or the like.

Example II: Two hundred and ninety-four parts of para-para-diaminodiphenyl-ether of hydroquinon are diazotized in the usual manner by means of one hundred and forty parts of sodium nitrite. Two hundred and forty-seven parts of the sodium salt of 2-naphthol-7-sulfonic acid dissolved in water with an excess of sodium carbonate are added to the well-cooled tetrazo compound. After the formation of the intermediate compound is complete a solution of two hundred and thirty-nine parts of 2-amino-5-naphthol-7-sulfonic acid is added, and the mixture of the reaction is stirred until the formation of the disazo dyestuff is complete. The dyestuff thus obtained dyes unmordanted cotton red shades.

The 2-naphthol-7-sulfonic acid can be replaced by the substituted derivatives of 2-amino-5-naphthol-7-sulfonic acid or by any other component suitable for the preparation of azo dyestuffs.

| Dyestuff from para-para-diaminodiphenyl-ether of hydroquinone + | dyes unmordanted cotton— |
|---|---|
| 1. 2 mol. of 2.5-aminonaphthol-7-sulfonic acid | scarlet |
| 2. 1 mol. of 2.5-aminonaphthol-7-sulfonic acid (acid solution) +1 mol. of 2.5-aminonaphthol-7-sulfonic acid (alkaline solution) | scarlet |
| 3. 1 mol. of 1-naphthol-4-sulfonic acid +1 mol. of 2.5-aminonaphthol-7-sulfonic acid | yellowish red |
| 4. 1 mol. of 2-naphthol-7-sulfonic acid +1 mol. of 2.5-aminonaphthol-7-sulfonic acid | red |
| 5. 1 mol. of 2-phenylamino-5-naphthol-7-sulfonic acid +1 mol. of 2.5-aminonaphthol-7-sulfonic acid | red |
| 6. 1 mol. of 2.5-aminonaphthol-7-sulfonic acid +1 mol. of 2.5-dioxynaphthalene-7-sulfonic acid | scarlet |
| 7. 1 mol. of 2-acetylamino-8-naphthol-6-sulfonic acid +1 mol. of 2.5-aminonaphthol-7-sulfonic acid | red |
| 8. 1 mol. of 2-acetylamino-5-naphthol-7-sulfonic acid +1 mol. of 2-amino-5-naphthol-7-sulfonic acid | red |
| 9. 1 mol. of 2.5-aminonaphthol-7-sulfonic acid +1 mol. of the glycin of 2.5-aminonaphthol-7-sulfonic acid | yellowish red |
| 10. 1 mol. of 2.5-aminonaphthol-7-sulfonic acid +1 mol. of 2.5-aminonaphthol-1.7-disulfonic acid | scarlet |
| 11. 1 mol. of 2-acetylamino-8-naphthol-6-sulfonic acid +1 mol. of 2-phenylamino-5-naphthol-7-sulfonic acid | red |
| 12. 1 mol. of 2.5-aminonaphthol-7-sulfonic acid +1 mol. of 5.5-dioxy-2.2-dinaphthylamin-7.7-disulfonic acid | bluish red |
| 13. 1 mol. of 2-acetylamino-8-naphthol-6-sulfonic acid + 1 mol. of the glycin of 2.5-aminonaphthol-7-sulfonic acid | red |

Having now described my invention and in what manner the same is to be performed, what I claim as new, and desire to secure by Letters Patent, is—

1. The herein-described new tetrazo dyestuffs of the general formula:

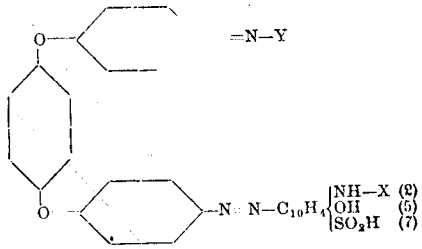

wherein Y stands for an azo-dyestuff component and X for hydrogen, aryl, alkyl, acidyl, which in the shape of their alkaline salts are dark powders soluble in water with a red color; dyeing unmordanted cotton red shades; and yielding upon reduction with stannous chlorid and hydrochloric acid para-para-diaminodiphenylether of hydroquinon, substantially as hereinbefore described.

2. The herein-described new tetrazo dyestuff of the formula:

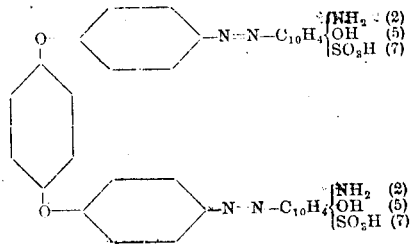

which in the shape of its sodium salt is a dark powder having a metallic luster soluble in water with a red and in concentrated sulfuric acid with a violet color; dyeing unmordanted cotton scarlet-red shades; and yielding upon reduction with stannous chlorid and hydrochloric acid para-para-diaminodiphenylether of hydroquinon and diamino-5-naphthol-7-sulfonic acid, substantially as hereinbefore described.

In testimony whereof I have hereunto set my hand in the presence of two subscribing witnesses.

WILHELM BAUER. [L. S.]

Witnesses:
OTTO KÖNIG,
J. A. RITTERSHAUS.